(No Model.)
T. J. FAY.
SYSTEM OF ELECTRICAL DISTRIBUTION.
No. 521,436. Patented June 12, 1894.
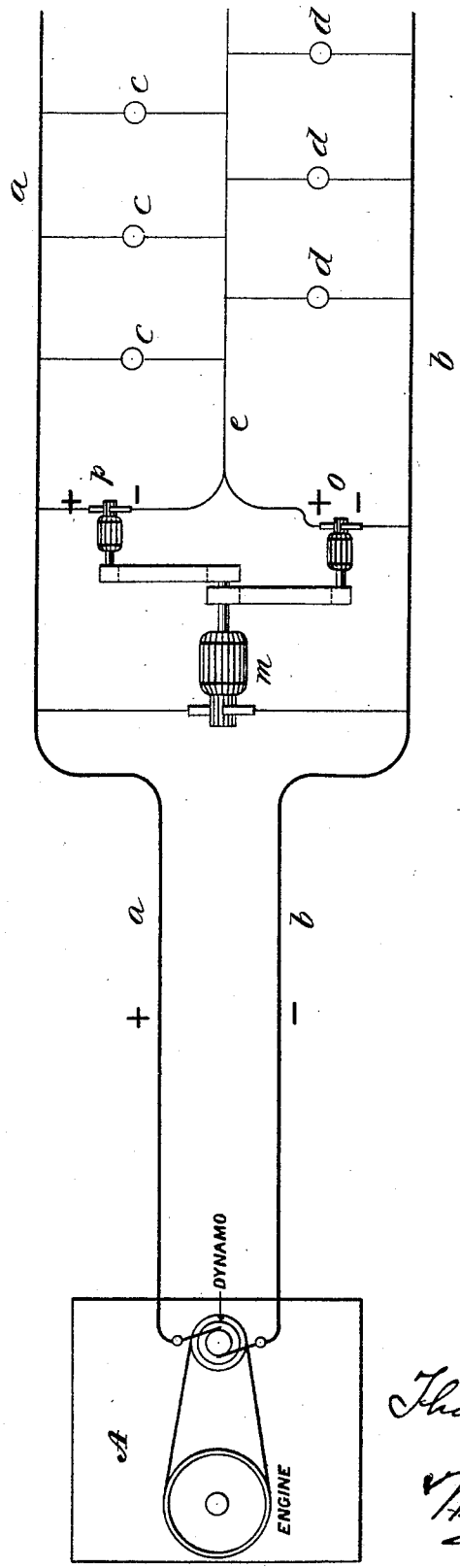
WITNESSES:
Frank S. Ober
C. V. Edwards.
INVENTOR
Thomas J. Fay
BY
Wm A. Rosenbaum
ATTORNEY

UNITED STATES PATENT OFFICE.

THOMAS J. FAY, OF NEW YORK, N. Y., ASSIGNOR TO THE C. & C. ELECTRIC COMPANY, OF NEW JERSEY.

SYSTEM OF ELECTRICAL DISTRIBUTION.

SPECIFICATION forming part of Letters Patent No. 521,436, dated June 12, 1894.

Application filed February 15, 1894. Serial No. 500,217. (No model.)

*To all whom it may concern:*

Be it known that I, THOMAS J. FAY, a citizen of the United States, residing at New York, in the county of New York and State of New York, have invented certain new and useful Improvements in Systems of Electrical Distribution, of which the following is a full, clear, and exact description.

My present invention relates to what is known as the multiple wire system of distribution and is designed to regulate or determine the distribution of electrical energy among the several groups of translating devices.

The well known "three wire" system of distribution involves the use of a generator or battery of generators, two main conductors, a compensating conductor and two groups of translating devices connected respectively between the compensating conductor and the two mains. The compensating conductor extends back to the generators and is there connected in such a manner that when a difference of potential exists between the two sides of the system due to a difference in load, a current travels along the compensating conductor, the polarity of which is determined by which side is the heavier loaded, and the system is balanced by reason of this current in the compensating conductor. In my system the same arrangement of the translating devices is used, but the balancing or compensating is accomplished in a different manner and by means of apparatus which does not require that the compensating conductor shall extend back to the generating station. This fact results in a saving of wire and a saving of power.

My invention consists of the combination of apparatus hereinafter described and claimed.

The invention will be described in detail with reference to the accompanying drawing, in which the figure represents a diagram of the apparatus and circuits constituting my invention.

Referring to the drawing by letter, A represents the generating station of the system. Here will be located one or more generators connected together in any desired manner and supplying current to the two main conductors $a$ and $b$. These conductors will extend to the "centers of distribution," from which point an additional or compensating conductor $e$ will be run as a complement. The translating devices, which are represented by $c$ and $d$ and which may be lamps, motors, or other devices, are connected from the two mains $a$ and $b$ to the compensating conductor $e$, in the same manner as in the ordinary three wire system.

$o$ and $p$ respectively represent small constant potential generators the capacity of which will be equal to or will exceed the greatest variation which may take place, in practice, in the loads on the two sides of the system. The two generators $o$ and $p$ are coupled in series across the two mains $a$ and $b$ and the conductor connecting them together will be connected with the compensating conductor $e$ at any desired point, preferably at the distributing point where it will be more accessible than at the remote portions of the circuit. These generators are driven by a small motor $m$ which is belted or otherwise geared to both generators and which will receive its propelling current either from the mains $a$ and $b$ or from any other suitable source of supply. The motor merely represents a source of power and may be substituted by an engine of any character. The electromotive force of these dynamos will be constant and at least equal to that of the main line at the points where the dynamos are connected thereto.

The two groups of translating devices are respectively represented by $c$ and $d$. In the normal operation of the system; that is, when the current required to supply the translating devices on one side equals that required on the other, the circuits will be as follows: Supposing wire $a$ to be positive, the current from the main station A will travel along the wire $a$, thence through translating devices $c$, translating devices $d$ and along wire $b$ to the main station. Under this condition the two small generators $o$ and $p$, which are in series with each other, will be running with a tendency to augment the current from the main station, over a circuit which includes the controlling translating devices $c$ and $d$ and the dynamos $o$ and $p$ in series. Now suppose additional translating devices be cut into the side of the system with the lamps *d*. This will cause a rise in potential between the wires *e* and *a*. The result is that dynamo *o* will immediately send its current along the positive conductor *e* through the devices *d* and back to *a*, shunting dynamo *p*. The side containing the *d* devices will therefore receive additional current in proportion to the necessity and the potentials will again become balanced. If lamps are removed from the group *d* the potential of the side *c* will fall and the current generated by dynamo *p* will supply the deficiency on that side, the current in the compensating conductor being then in the opposite direction. It will therefore be seen that the two generators *o* and *p* running continuously will at all times tend to augment the main station A and at the same time will automatically supply any deficiency on either side of the system and will thereby maintain the entire system perfectly balanced. With apparatus of this nature the dead resistances which are commonly used in the main wires *a* and *b* are dispensed with and the loss of power which their use entails is not experienced. Furthermore, when the compensating wire *e* extends back to the main station its resistance is correspondingly increased and the compensation is therefore not accomplished without the loss of power in overcoming that resistance. In distributing systems extending over large areas this wire, although small compared with the mains, is a serious item of expense in the installation, which my system entirely eliminates.

There is another advantage in this system which has not before been pointed out, and that is in the fact that I am able to use at the main generating station over compounded dynamos. Such machines cannot be successfully used on the ordinary three wire system because when a variation takes place in the loads on the two sides of the system the potential of the machines on one side rises while the other side lowers at times, to such an extent as to result in a reversal of the machines having the lower potential. In my improved system the potential across the mains at the station does not vary, the sides of the system being balanced by the small generators *o* and *p*. Hence any form of compound wound machines may be used without the liability of reversals referred to.

I am aware of the compensating system wherein two machines are connected in series across the mains, said machines running either as dynamos or motors and mechanically connected so that when one acts as a motor it will drive the other, the operation being to transfer energy from one side of the system to the other, and this I do not claim.

My two machines are distinctly generators, both of which are driven by a power external to either and for the purposes of my invention a separate engine or motor may be used to drive each dynamo.

My invention is confined to mechanical generators or dynamo electric machines at the points *o* and *p*, for secondary batteries would not serve the same purpose and an automatic system could not be produced with them.

Having thus described my invention, I claim—

1. In a multiple series system of distribution, the combination of a main generating station, two main conductors leading therefrom, an intermediate or compensating conductor between the groups or sets of translating devices, two generators connected in series with each other and normally tending to augment the supply of current to the mains, but so connected as to supply extra current to either group of translating devices which requires it in order to establish a balance between the two groups, and an electric motor driving both generators and supplied with current from the mains, substantially as described.

2. In a multiple series system of distribution, the combination of a main generating station, two main conductors leading therefrom, an intermediate or compensating conductor between the groups or sets of translating devices, two generators connected in series with each other and normally tending to augment the supply of current to the mains, but so connected as to supply extra current to either group of translating devices which requires it in order to establish a balance between the two groups, said generators being driven by electric power derived from the two main conductors, substantially as described.

In testimony whereof I subscribe my signature in presence of two witnesses.

THOMAS J. FAY.

Witnesses:
FRANK S. OBER,
C. V. EDWARDS.